United States Patent
Hur et al.

(10) Patent No.: US 10,198,357 B2
(45) Date of Patent: Feb. 5, 2019

(54) COHERENT INTERCONNECT FOR MANAGING SNOOP OPERATION AND DATA PROCESSING APPARATUS INCLUDING THE SAME

(71) Applicant: SAMSUNG ELECTRONICS CO., LTD., Suwon-si, Gyeonggi-Do (KR)

(72) Inventors: Jae Young Hur, Hwaseong-si (KR); Sung Min Hong, Yongin-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 62 days.

(21) Appl. No.: 15/240,212

(22) Filed: Aug. 18, 2016

(65) Prior Publication Data

US 2017/0091092 A1   Mar. 30, 2017

(30) Foreign Application Priority Data

Sep. 30, 2015   (KR) .......................... 10-2015-0137385

(51) Int. Cl.
*G06F 12/0831* (2016.01)

(52) U.S. Cl.
CPC ...... *G06F 12/0833* (2013.01); *G06F 2212/68* (2013.01)

(58) Field of Classification Search
CPC ............. G06F 12/0833; G06F 12/0831; G06F 12/084; G06F 12/0815; G06F 12/0817; G06F 12/082; G06F 12/0822; G06F 2212/68; G06F 9/46
See application file for complete search history.

(56) References Cited

U.S. PATENT DOCUMENTS

| | | | |
|---|---|---|---|
| 6,266,743 B1 * | 7/2001 | Carpenter | G06F 12/082 |
| | | | 711/122 |
| 7,284,097 B2 | 10/2007 | Dodson et al. | |
| 7,925,840 B2 | 4/2011 | Harris et al. | |
| 8,131,941 B2 | 3/2012 | Kinter | |
| 8,347,040 B2 | 1/2013 | Lilly et al. | |
| 8,635,410 B1 | 1/2014 | Kuskin | |
| 8,694,736 B2 | 4/2014 | Beers et al. | |
| 8,706,965 B2 | 4/2014 | Piry et al. | |
| 2004/0193809 A1 * | 9/2004 | Dieffenderfer | G06F 12/0831 |
| | | | 711/146 |
| 2006/0143403 A1 * | 6/2006 | Barrett | G06F 12/0817 |
| | | | 711/141 |

(Continued)

FOREIGN PATENT DOCUMENTS

EP   2156302   8/2011

OTHER PUBLICATIONS

Harriman-Smith, David; AXI Protocol—Strobe Signal Value, Jan. 8, 2014 (Year: 2014).*
AMBA AXI and ACE Protocol Specification, 2011 (Year: 2011).*

*Primary Examiner* — Michael Krofcheck
(74) *Attorney, Agent, or Firm* — F. Chau & Associates, LLC

(57) ABSTRACT

A coherent interconnect is provided. The coherent interconnect includes a snoop filter and a circuit that receives a write request, strobe bits, and write data from a central processing unit (CPU); generates a snoop filter request based on the write request; and transmits, at substantially the same time, the snoop filter request to the snoop filter and the write request, the strobe bits, and the write data to a memory controller.

15 Claims, 11 Drawing Sheets

(56) References Cited

U.S. PATENT DOCUMENTS

| | | | |
|---|---|---|---|
| 2009/0313402 A1* | 12/2009 | Nara | G06F 13/4059 |
| | | | 710/52 |
| 2011/0082981 A1* | 4/2011 | Hoogerbrugge | G06F 12/0822 |
| | | | 711/119 |
| 2011/0161346 A1* | 6/2011 | Solihin | G06F 12/082 |
| | | | 707/769 |
| 2011/0161599 A1 | 6/2011 | Craske | |
| 2015/0046616 A1* | 2/2015 | Pedersen | G06F 13/362 |
| | | | 710/110 |
| 2015/0199290 A1* | 7/2015 | Mathewson | G06F 13/4068 |
| | | | 710/110 |

* cited by examiner

COHERENT INTERCONNECT FOR MANAGING SNOOP OPERATION AND DATA PROCESSING APPARATUS INCLUDING THE SAME

CROSS-REFERENCE TO RELATED APPLICATION

This application claims priority under 35 U.S.C. § 119(a) to Korean Patent Application No. 10-2015-0137385 filed on Sep. 30, 2015, the disclosure of which is incorporated by reference in its entirety herein.

BACKGROUND

1. Technical Field

Embodiments of the inventive concept relate to a coherent interconnect for managing a snoop operation and a data processing apparatus including the same.

2. Discussion of Related Art

In the field of computer science, cache coherence is the consistency between local caches respectively included in clients (or processors) in a shared memory system. When each of the clients includes its own local cache and the clients share memory with each other, a problem of cache coherence may occur if one of the caches in the clients is updated.

When the cache coherence problem occurs, operations may be performed to ensure cache coherence that include writing data to a shared memory of the shared memory system. However, when the shared memory system writes the data to the shared memory using these operations, latency in a write operation may increase.

SUMMARY

According to an exemplary embodiment of the inventive concept, there is provided a coherent interconnect including a snoop filter and a coherence manager (e.g., a circuit). The coherence manager receives a write request, strobe bits, and write data from a central processing unit (CPU); generates a snoop filter request based on the write request; and at substantially the same time, transmits the snoop filter request to the snoop filter and transmits the write request, the strobe bits, and the write data to a memory controller. The coherence manager may transmit the write request, the strobe bits, and the write data to the memory controller without waiting for a snoop filter response generated from the snoop filter based on the snoop filter request.

The coherence manager may send a second CPU an invalidation signal for invalidating data stored in a cache of the second CPU related to the write request based on a snoop filter response output from the snoop filter that indicates a hit.

The coherence manager may perform de-allocation on an entry related to the write request in response to an invalidation completion response output from the second CPU and a write completion response output from the memory controller with respect to the write data.

When the write request includes an indicator bit, the coherence manager may determine whether to store the strobe bits in a strobe buffer included in the coherence manager based on the indicator bit.

Each of the strobe bits may indicate whether a corresponding byte included in the write data is to be updated; and the coherence manager may store the strobe bits in the strobe buffer only when the indicator bit has a bit value indicating a partial cache-line write.

The coherence manager may generate a snoop request to be transmitted to the second CPU based on the snoop filter response output from the snoop filter and that indicates a hit; may invert a bit value of each of the strobe bits stored in the strobe buffer to generate inverted strobe bits based on a snoop response output from the second CPU that includes dirty data; and may transmit the inverted strobe bits and the dirty data to the memory controller.

The coherence manager may perform de-allocation of the entry related to the write request in response to the snoop response output from the second CPU, a first write completion response output from the memory controller with respect to the write data, and a second write completion response output from the memory controller with respect to the dirty data.

According to an exemplary embodiment of the inventive concept, there is provided a data processing apparatus including a first CPU; a second CPU including a cache; a memory controller; and a coherent interconnect connected with the first CPU, the second CPU, and the memory controller. The coherent interconnect includes a snoop filter and a coherence manager. The coherence manager receives a write request, strobe bits, and write data from the first CPU; generates a snoop filter request based on the write request; and at substantially the same time, transmits the snoop filter request to the snoop filter and transmits the write request, the strobe bits, and the write data to the memory controller.

According to an exemplary embodiment of the inventive concept, there is provided a data processing system including a memory and a data processing apparatus connected with the memory. The data processing apparatus includes a first CPU; a second CPU including a cache; a memory controller connected with the memory; and a coherent interconnect connected with the first CPU, the second CPU, and the memory controller. The coherent interconnect includes a snoop filter and a coherence manager (e.g., a circuit). The coherence manager receives a write request, strobe bits, and write data from the first CPU; generates a snoop filter request based on the write request; and at substantially the same time, transmits the snoop filter request to the snoop filter and transmits the write request, the strobe bits, and the write data to a memory controller. The memory controller may output a write completion response to the coherence manager as soon the memory controller receives at least one among the write request, the strobe bits, and the write data.

The coherence manager may send the second CPU an invalidation signal for invalidating data stored in the cache related to the write request based on a snoop filter response output from the snoop filter that indicates a hit. The coherence manager may perform de-allocation on an entry related to the write request in response to an invalidation completion response output from the second CPU and the write completion response.

The write request may include an indicator bit; each of the strobe bits may indicate whether a corresponding byte included in the write data is to be updated; and the coherence manager may store the strobe bits in the strobe buffer only when the indicator bit has a bit value indicating a partial cache-line write. The memory controller may write part of the write data to the memory based on the strobe bits.

The coherence manager may generate a snoop request based on a snoop filter response output from the snoop filter that indicates a hit; may transmit the snoop request to the second CPU; may invert a bit value of each of the strobe bits stored in the strobe buffer based on a snoop response to generate inverted strobe bits output from the second CPU that includes dirty data, and may transmit the inverted strobe bits and the dirty data to the memory controller. The memory controller may write part of the dirty data to the memory based on the inverted strobe bits.

The data processing system may further include an input/output device and a protocol converter configured to convert a first indicator signal output from the input/output device into a second indicator signal and to transmit the second indicator signal to the coherent interconnect. The input/output device may share data with the first CPU or the second CPU but may not trigger a coherent transaction.

According to an exemplary embodiment of the inventive concept, there is provided a data processing apparatus including a central processing unit (CPU) including a cache; a memory controller connected with a memory, and a coherent interconnect connected with the CPU and the memory controller. The coherent interconnect includes a snoop filter configured to perform a snoop operation to determine whether a copy of data present in the memory associated with a write request is present in the cache and a circuit configured to receive the write request and write data, generate a snoop filter request based on the write request to request performance of the snoop operation, and at substantially the same time, transmit the snoop filter request to the snoop filter, transmit the write request to the memory controller, and transmit the write data to the memory controller.

BRIEF DESCRIPTION OF THE DRAWINGS

The inventive concept will become more apparent by describing in detail exemplary embodiments thereof with reference to the attached drawings in which.

DETAILED DESCRIPTION

Figure 1:
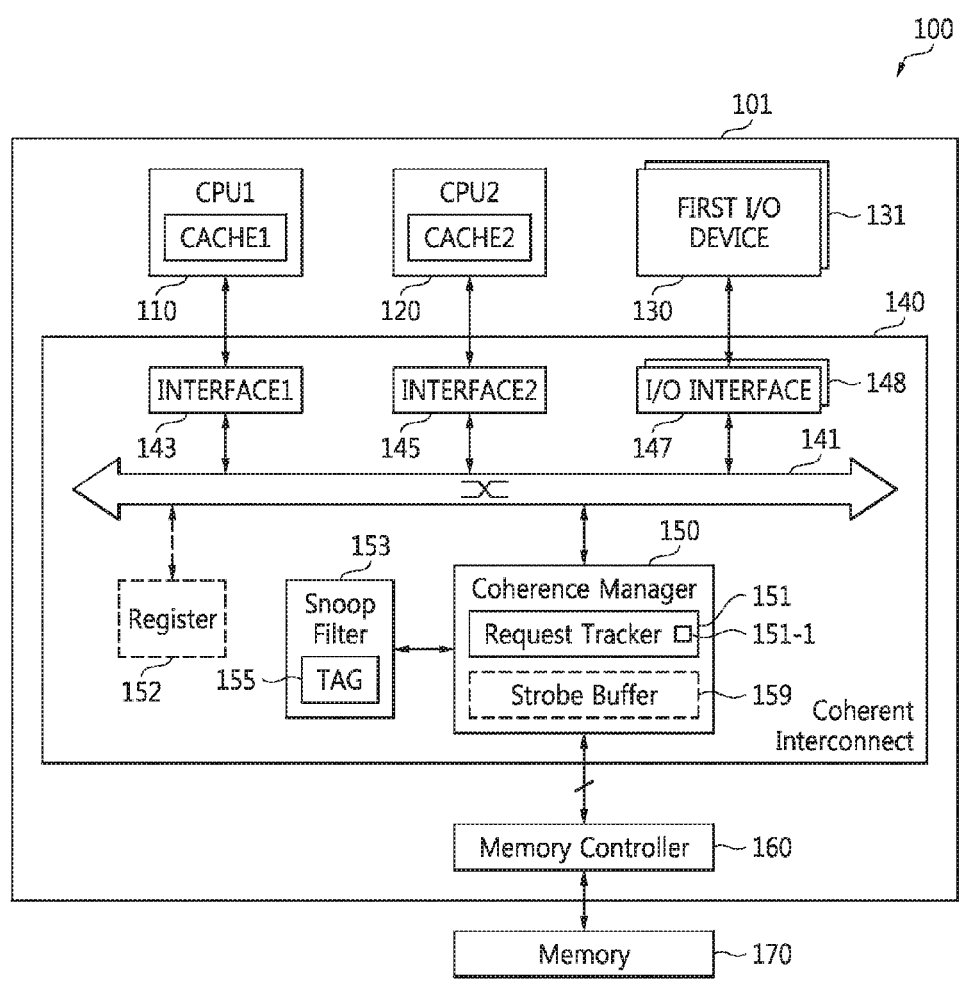
FIG. 1 is a block diagram of a data processing system according to an exemplary embodiment of the inventive concept.

The inventive concept now will be described more fully hereinafter with reference to the accompanying drawings, in which embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. As used herein, the singular forms "a", "an" and "the" are intended to include the plural forms as well, unless the context clearly indicates otherwise.

FIG. 1 is a block diagram of a data processing system 100 according to an exemplary embodiment of the inventive concept. Referring to FIG. 1, the data processing system 100 includes a data processing apparatus (or device) 101 and a memory 170. The data processing system 100 (or 100A in FIG. 9) may be a personal computer (PC) or a mobile device. The mobile device may be implemented as a laptop computer, a cellular phone, a smart phone, a tablet PC, a personal digital assistant (PDA), an enterprise digital assistant (EDA), a digital still camera, a digital video camera, a portable multimedia player (PMP), a personal navigation device or portable navigation device (PND), a handheld game console, a mobile internet device (MID), a wearable computer, an internet of things (IoT) device, an internet of everything (IoE) device, or a drone, but the inventive concept is not limited to these examples.

The data processing apparatus 101 may control a write operation and a read operation of the memory 170. The memory 170 may be dynamic random access memory (DRAM). In an exemplary embodiment, the memory 170 is a non-volatile memory. The data processing apparatus 101 may be an integrated circuit (IC), a system on chip (SoC), a processor, an application processor (AP), a mobile AP, a chipset, or a group of chips. For example, a second package including the memory 170 may be stacked on or above a first package including the data processing apparatus 101 in a system-in-package (SiP), but the inventive concept is not limited thereto.

The data processing apparatus 101 may include a plurality of central processing units (CPUs) 110 and 120, a plurality of input/output (I/O) devices 130 and 131, a coherent interconnect (or coherent interconnect device or a coherent interconnect fabric) 140 and a memory controller 160. For example, the CPUs 110 and 120 and the I/O devices 130 and 131 each may be used as a master.

The CPUs 110 and 120 may include caches CACHE1 and CACHE2, respectively. For example, each of the caches CACHE1 and CACHE2 may be a level-1 cache and/or a level-2 cache. In an embodiment, the level-2 cache has a higher storage capacity or a higher latency than the level-1 cache. Each of the CPUs 110 and 120 may be a processor and one of the CPUs 110 and 120 may be a graphics processing unit (GPU).

Each of the I/O devices 130 and 131 may share data with each of the CPUs 110 and 120 and may generate or trigger a coherent transaction. For example, the coherent transaction may be a transaction triggering (or inducing) snooping or a snooping operation and the transaction may be a write operation or a read operation. For example, a snooping operation may be used to determine whether data in the caches is consistent with data in the memory 170. For example, one of the I/O devices 130 and 131 may be a graphics engine, but the inventive concept is not limited thereto.

The coherent interconnect 140 may include a snoop filter 153 and a cache coherence manager 150 (e.g., a circuit). The cache coherence manager 150 may receive a write request and write data output from the CPU 110 or 120, may generate a snoop filter request based on the write request, and may simultaneously (at the same time, at substantially the same time, or concurrently) transmit the snoop filter request to the snoop filter 153 and the write request and the write data to a memory controller 160. In an embodiment, the cache coherence manager 150 immediately transmits the write request and the write data to the memory controller 160 without waiting for a snoop filter response generated by the snoop filter 153 based on the snoop filter request. Accordingly, data stored in the memory 170 may be immediately updated with the write data.

The coherent interconnect 140 may refer to a coherence interconnect circuit, a cache coherent interconnect, or a cache coherency circuit. The coherent interconnect 140 may include a set of wires, i.e., a wire set 141 (e.g., a data bus), a first interface 143, a second interface 145, I/O interfaces 147 and 148, the cache coherence manager (or a coherence manager) 150, and the snoop filter 153.

The first CPU 110 and the coherence manager 150 may communicate (transmit or receive) a command or data with each other through the wire set 141 and the first interface 143. The second CPU 120 and the coherence manager 150 may communicate a command or data with each other through the wire set 141 and the second interface 145. The I/O devices 130 and 131 may communicate a command or data with the wire set 141 through the I/O interfaces 147 and 148, respectively. The wire set 141 may include wires which can form the topology of the coherent interconnect 140.

In an embodiment, the coherence manager 150 receives a write request and write data output from the CPU 110 or 120, generates a snoop filter request based on the write request, and simultaneously (or at substantially the same time) transmits the snoop filter request to the snoop filter 153 and the write request and the write data to a memory controller 160. The write request may be a signal that indicates the corresponding CPU desires to write the write data to memory 170. The coherence manager 150 may include a request tracker 151 which controls the operations of the coherence manager 150. In an embodiment, the coherence manager 150 is implemented by a processor, a microprocessor, or logic circuits.

The request tracker 151 may include a memory or queue 151-1 which stores information indicating allocation of a write request and de-allocation of the write request. For example, the queue 151-1 may include an entry having a first value that indicates a write is to be performed or a second value indicating the write has been completed. The operation of the memory or queue 151-1 will be described in further detail with reference to FIG. 3.

In an embodiment, when the data processing apparatus 101 processes only a full cache-line write (or a full cache-line write operation), the coherence manager 150 does not include a request buffer which stores a write request output from the CPU 110 or 120 and a data buffer which stores write data output from the CPU 110 or 120. In an embodiment, when the data processing apparatus 101 processes only a partial cache-line write (or a partial cache-line write operation) or processes both a full cache-line write and a partial cache-line write, the coherence manager 150 includes only a strobe buffer 159 which stores strobe bits output from the CPU 110 or 120 and does not include a data buffer which stores write data output from the CPU 110 or 120.

A register 152 may store a control signal for enabling or disabling the coherence manager 150. The control signal may be output from one of the CPUs 110 and 120. For example, the register 152 may store a first value when the control signal indicates that the coherence manager 150 is to be enabled and a second other value when the control signal indicates that the coherence manager 150 is to be disabled. The register 152 may be implemented by a latch or a memory as an example.

The snoop filter 153 may output a snoop filter response indicating a hit or a miss to the request tracker 151 in response to a snoop filter request output from the request tracker 151. In an embodiment, the hit means that data associated with the write data has been found within a cache and the miss means that data associated with the write data has not been found in the cache. For example, the associated data may be a copy of data that is stored in memory 170. In an embodiment, the request tracker 151 and the snooper filter 153 are implemented by processors and/or other logic circuits. The snoop filter 153 may include a tag memory 155 which stores tag information (or cache allocation information) regarding a cache line of the CPU 110 or 120. For example, the tag memory 155 may be static RAM (SRAM) but is not limited thereto. Although the tag memory 155 is implemented inside the snoop filter 153 in the embodiments illustrated in FIG. 1, the tag memory 155 may be implemented outside the snoop filter 153 in other embodiments.

For example, the snoop filter 153 receives a snoop filter request including a write address, searches (or retrieve) the tag memory 155 using the write address, and outputs a snoop filter response indicating a hit or a miss to the request tracker 151 according to the search result. The searching of the tag memory 155 and/or the outputting of the snoop filter response may be referred to as a snoop operation.

The request tracker 151 may output an invalidation signal (or a snoop request) to a snooped CPU 110 or 120 through the wire set 141 and the interface 143 or 145 based on a snoop filter response indicating a hit and may receive an invalidation completion response (or a snoop completion response) output from the snooped CPU 110 or 120 through the interface 143 or 145 and the wire set 141. For example, when the write data is to update data stored in the memory 170 that has a copy in a cache of a snooped CPU, the invalidation signal can be used to delete the copy so it is does not become inconsistent with the updated data in the memory 170.

When sending a snoop filter request to the snoop filter 153, the request tracker 151 may transmit a write request and write data output from the CPU 110 or 120 to the memory controller 160. The memory controller 160 may send a write completion response for the write request to the coherence manager 150 as soon as the memory controller 160 receives the write request and the write data. The memory controller 160 may transmit a write command related to the write request and the write data to the memory 170. The memory 170 may write the write data to a memory area of the memory 170 based on the write command. Thus, the memory controller 160 may send the write completion response to the coherence manager before it has actually completed writing of the write data to the memory 170.

In an embodiment, the request tracker 151 de-allocates an entry of the request tracker 151 for a write request (or a write transaction) based on an invalidation signal (or a snoop request) output from the snooped CPU 110 or 120 and a write completion response output from the memory controller 160. In an embodiment, the request tracker 151 transmits a write request completion response to the CPU 110 or 120 after de-allocating the entry.

Figure 2:
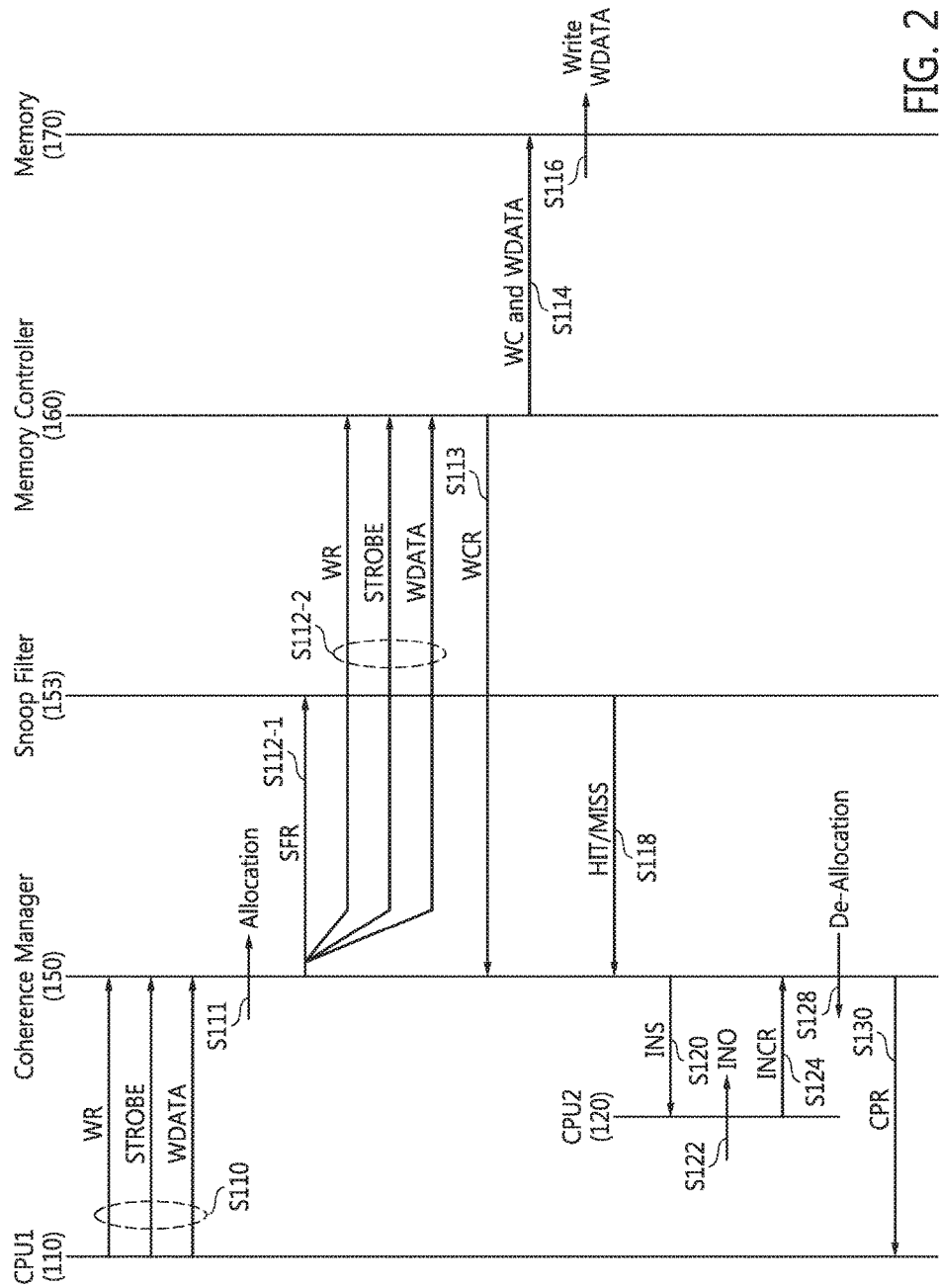
FIG. 2 is a diagram of a data flow for explaining a full cache-line write of the data processing system illustrated in FIG. 1.
Figure 3:
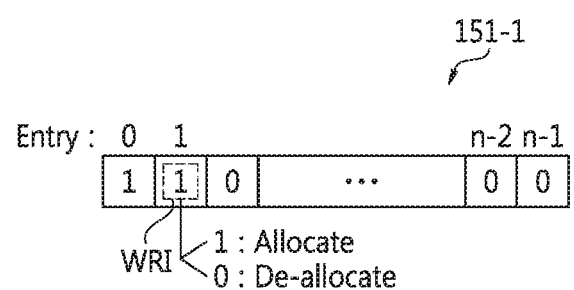
FIG. 3 is a conceptual diagram for explaining the entry allocation and entry de-allocation of a request tracker illustrated in FIG. 1.
Figure 4:
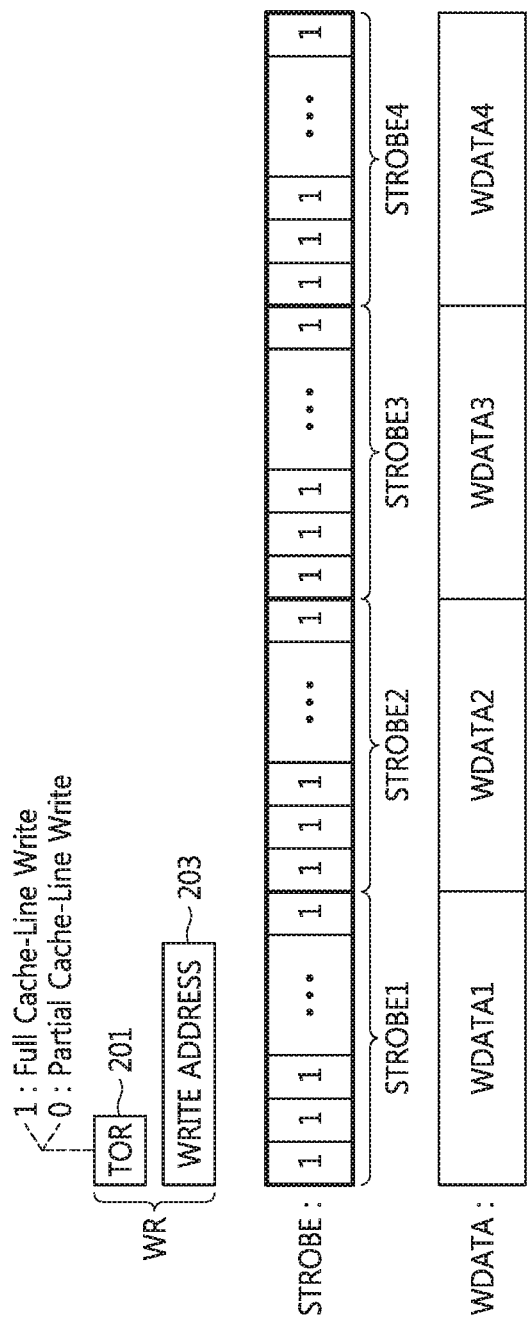
FIG. 4 is a diagram of a write request, strobe bits, and write data used in the data processing system illustrated in FIG. 1.
Figure 5:
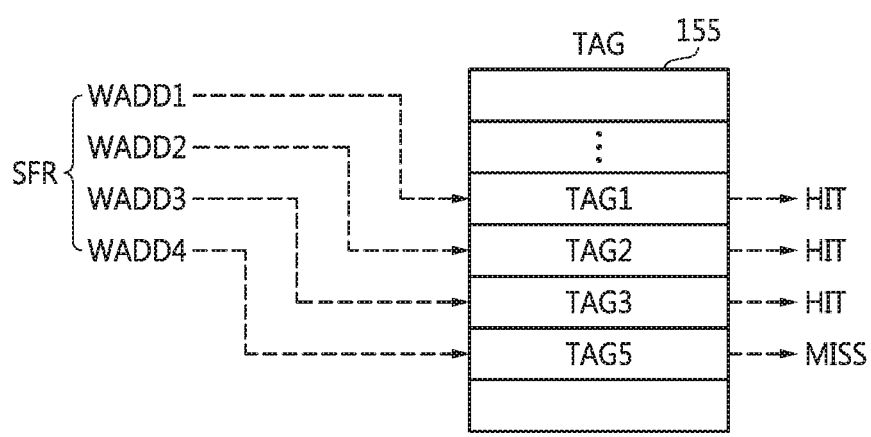
FIG. 5 is a conceptual diagram for explaining the operation of a snoop filter illustrated in FIG. 1.

FIG. 2 is a diagram of a data flow for explaining a full cache-line write of the data processing system 100 illustrated in FIG. 1. FIG. 3 is a conceptual diagram for explaining the entry allocation and entry de-allocation of the request tracker 151 illustrated in FIG. 1. FIG. 4 is a diagram of a write request, strobe bits, and write data used in the data processing system 100 illustrated in FIG. 1. FIG. 5 is a conceptual diagram for explaining the operation of the snoop filter 153 illustrated in FIG. 1.

Referring to FIGS. 1 through 5, the coherence manager 150 receives a write request WR, strobe bits STROBE, and write data WDATA output from the first CPU 110 through the first interface 143 and the wire set 141 in operation S110.

As shown in FIG. 4, the write request WR may include an indicator bit 201 indicating a type of request and a write address 203. The indicator bit 201 may include a bit value indicating a full cache-line write or a partial cache-line write. For example, the write request WR may indicate the full cache-line write when the bit value of the indicator bit 201 is logic 1 (or data 1) and may indicate the partial cache-line write when the bit value of the indicator bit 201 is logic 0 (or data 0).

The write address 203 may designate a memory area (e.g., a location) in which the write data WDATA will be stored in the memory 170. Each of the strobe bits STROBE may indicate whether a certain unit, e.g., a byte, in a segment, e.g., a plurality of bytes, in the write data WDATA will be updated or stored in the memory region of the memory 170. For example, the strobe bits STROBE may indicate which part or parts of the write data are to overwrite corresponding parts in the memory 170 or are to be stored in the memory 170.

For example, when a cache line of the cache CACHE1 or CACHE2 is greater than a bandwidth between the first CPU 110 and the first interface 143, the first CPU 110 may divide the write data WDATA into a plurality of data segments WDATA1 through WDATA4 and may sequentially output the data segments WDATA1 through WDATA4.

When it is assumed that the cache line or the write data WDATA to be processed is 64 bytes and the bandwidth between the first CPU 110 and the first interface 143 is 16 bytes, each of the data segments WDATA1 through WDATA4 is 16 bytes; strobe bits STROBE1 for the first write data segment WDATA1 are 16 bits; strobe bits STROBE2 for the second write data segment WDATA2 are 16 bits; strobe bits STROBE3 for the third write data segment WDATA3 are 16 bits; and strobe bits STROBE4 for the fourth write data segment WDATA4 are 16 bits. In other words, each of the strobe bits STROBE may correspond to one of the bytes in the write data WDATA. For example, each bit of the strobe bits STROBE that corresponds to a given write data, corresponds to a different byte of the write data.

It is assumed that each of the strobe bits STROBE is "1" for the full cache-line write. In other words, all of the bytes in the write data WDATA may be written to the memory area of the memory 170. For the sake of convenience, it is assumed that the write data WDATA is the first write data segment WDATA1. The write data segments WDATA2 through WDATA4 are processed in the same manner as or in a similar manner to the first write data segment WDATA1.

The structures of the write request WR, the strobe bits STROBE, and the write data WDATA illustrated in FIG. 4 are examples provided for the sake of convenience. The write request WR may include the strobe bits STROBE in other embodiments.

The request tracker 151 of the coherence manager 150 receives the write request WR, the strobe bits STROBE, and the write data WDATA from the first CPU 110 in operation S110 and allocates an entry (e.g., of 151-1) for the write request WR in operation S111.

As shown in FIG. 3, the request tracker 151 may allocate the write request WR to entry 1 Entry 1. When the write request WR is allocated to entry 1 Entry 1, the coherence manager 150 may perform a service, for example, operations related to the write request WR. The memory or queue 151-1 may include "n" entries Entry 0 to Entry n−1 and the request tracker 151 may allocate an input request to one of the "n" entries Entry 0 to Entry n−1. It is assumed that the write request WR is allocated when a bit value WRI of entry 1 Entry 1 is set to logic 1 and is de-allocated when the bit value WRI of entry 1 Entry 1 is logic 0.

The request tracker 151 generates a snoop filter request SFR based on the write request WR and transmits simultaneously or at substantially the same time, the snoop filter request SFR to the snoop filter 153 and the write request WR, the strobe bits STROBE, and the write data WDATA to the memory controller 160 in operations S112-1 and S112-2. In an embodiment, the write request WR, the strobe bits STROBE, and the write data WDATA are transmitted to the memory controller 160 in series or in parallel. The snoop filter request SFR is used by the snoop filter 153 to determine whether data associated with the write request WR is present in a cache of one of the CPUs. For example, if the write request WR is to be used to update data in memory 170, the snoop filter 153, upon receipt of the corresponding snoop filter request SFR, can determine whether a copy of the data is present (i.e., a hit) or not (i.e., a miss) in the CACHE2 of CPU2 120.

The request tracker 151 does not wait for a snoop filter response HIT/MISS to be output from the snoop filter 153 in response to the snoop filter request SFR and instead immediately transmits the write request WR, the strobe bits STROBE, and the write data WDATA to the memory controller 160 in operation S112-2.

The memory controller 160 may receive at least one among the write request WR, the strobe bits STROBE, and the write data WDATA and immediately send a write completion response WCR to the request tracker 151 regardless of whether the write data WDATA has been written to the memory 170. For example, the memory controller 160 can send a write completion response WCR to the request tracker 151 before it completes writing of the write data WDAT to memory 170.

The memory controller 160 sends a write command WC related to the write request WR and the write data WDATA to the memory 170 in operation S114. Since the bit values of the strobe bits STROBE are all logic 1, the memory controller 160 transmits the write command WC and the write data WDATA to the memory 170 in operation S114. The memory 170 writes the write data WDATA to a memory area based on the write command WC in operation S116.

The snoop filter 153 searches the tag memory 155 using a write address included in the snoop filter request SFR and outputs the snoop filter response HIT/MISS to the request tracker 151 according to the search result in operation S118.

As shown in FIG. 5, when tag information TAG1, TAG2, or TAG3 corresponding to a write address WADD1, WADD2, or WADD3 included in the snoop filter request SFR is present in the tag memory 155; the snoop filter 153 outputs the snoop filter response HIT indicating a hit to the request tracker 151 in operation S118. Here, the hit indicates that data corresponding to a write address included in the snoop filter request SFR has been stored in the second cache CACHE2 of the second CPU 120. The hit may be determined based on tag information stored in the tag memory 155. The tag information may indicate which CPU has stored the data corresponding to the write address in its cache. For example, the tag information could include a first part uniquely identifying one of the CPUs and second part indicating whether the data is present (i.e., a hit) or not present (i.e., a miss).

However, when tag information corresponding to a write address WADD4 included in the snoop filter request SFR is not present in the tag memory 155, the snoop filter 153 sends the snoop filter response MISS indicating a miss to the request tracker 151 in operation S118. Here, the miss indicates that data corresponding to a write address included in the snoop filter request SFR has not been stored in the second cache CACHE2 of the second CPU 120. The miss may be determined based on tag information stored in the tag memory 155.

The request tracker 151 of the coherence manager 150 sends the second CPU 120 an invalidation signal INS for invalidating the data related with the write request WR among data stored in the second cache CACHE2 of the second CPU 120 through the wire set 141 and the second interface 145 based on the snoop filter response HIT indicating a hit output from the snoop filter 153 in operation S120. For example, the invalidation signal INS may be an erase command for erasing data from the second cache CACHE2 of the second CPU 120. The second CPU 120 may perform an operation INO of invalidating or erasing the data related with the write request WR from the second cache CACHE2 in response to the invalidation signal INS in operation S122. For example, if a variable is stored in memory 170 and a copy of the variable is stored in a location of the second cache CACHE2 of the second CPU 120, an entry of the tag memory 155 associated with a write address of the variable would indicate a hit, and thus the request tracker 151 can invalidate or delete the copy in the second cache CACHE2 if the first CPU 110 requests that the variable be changed to a new value in memory 170 to ensure cache consistency.

When the invalidating operation INO is completed, the second CPU 120 sends an invalidation completion response INCR to the request tracker 151 of the coherence manager 150 in operation S124. The request tracker 151 of the coherence manager 150 performs de-allocation on entry 1 Entry 1 related to the write request WR based on the invalidation completion response INCR and the write completion response WCR in operation S128. For example, the request tracker 151 may change the bit value of entry 1 Entry 1 from logic 1 into logic 0 in the memory or queue 151-1 shown in FIG. 3. In other words, the allocation of the write request WR is canceled or de-allocated.

The request tracker 151 of the coherence manager 150 performs de-allocation on entry 1 Entry 1 related to the write request WR based on the invalidation completion response INCR regarding the data, which is stored in the second cache CACHE2 and is related to the write request WR, and the write completion response WCR output from the memory controller 160 in operation S128.

When the de-allocation of entry 1 Entry 1 is completed, the request tracker 151 of the coherence manager 150 sends a write request completion response CPR to the first CPU 110 through the wire set 141 and the first interface 143 in operation S130.

The request tracker 151 of the coherence manager 150 performs operations S112-1 and S112-2, thereby reducing latency of the write request WR or a write transaction. In addition, the request tracker 151 of the coherence manager 150 does not include any buffer for buffering the write request WR, the strobe bits STROBE, and the write data WDATA, thereby improving buffer occupancy of the write request WR or the write transaction.

Figure 6:
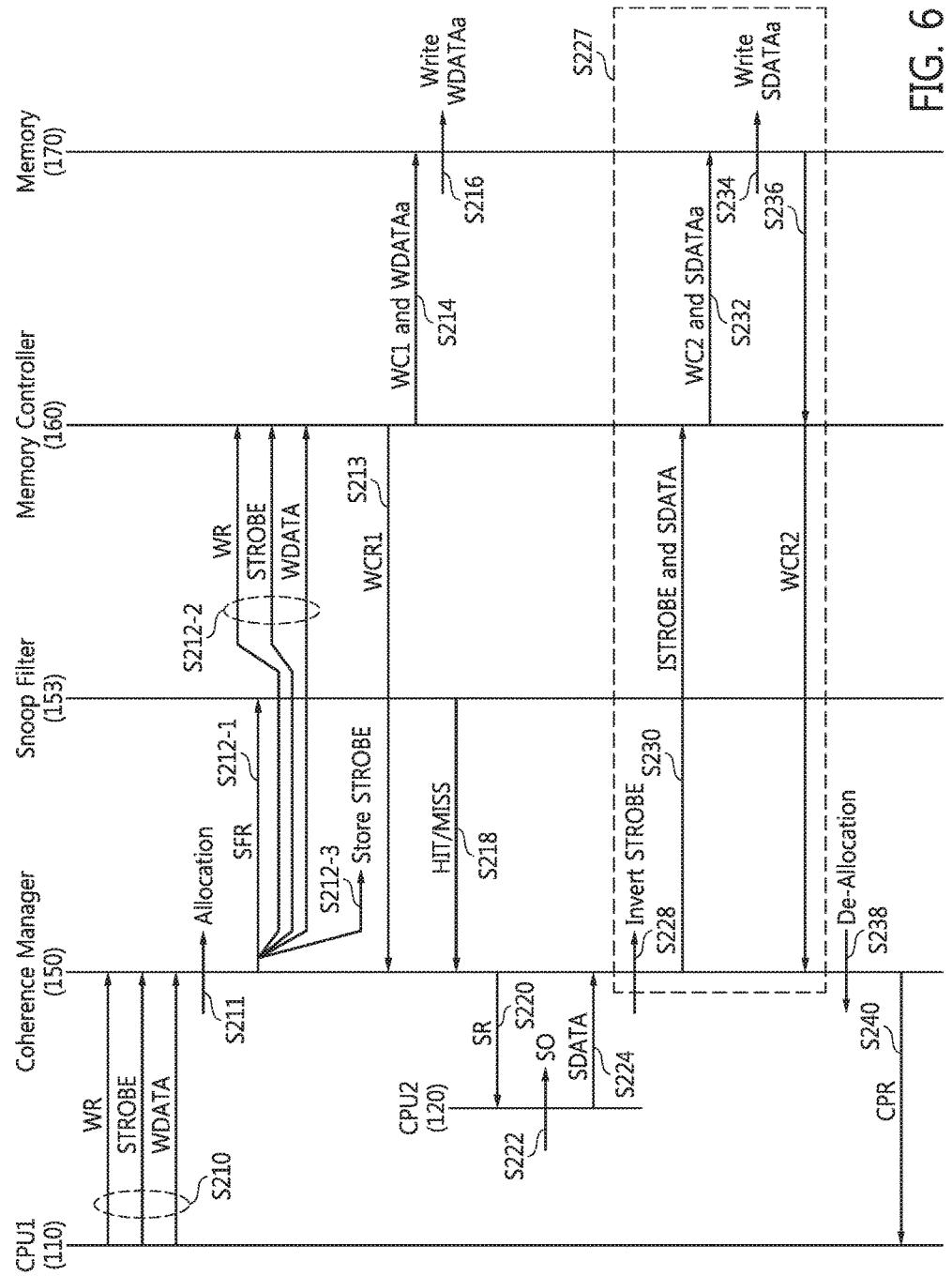
FIG. 6 is a diagram of a data flow for explaining a partial cache-line write of the data processing system illustrated in FIG. 1.
Figure 7:
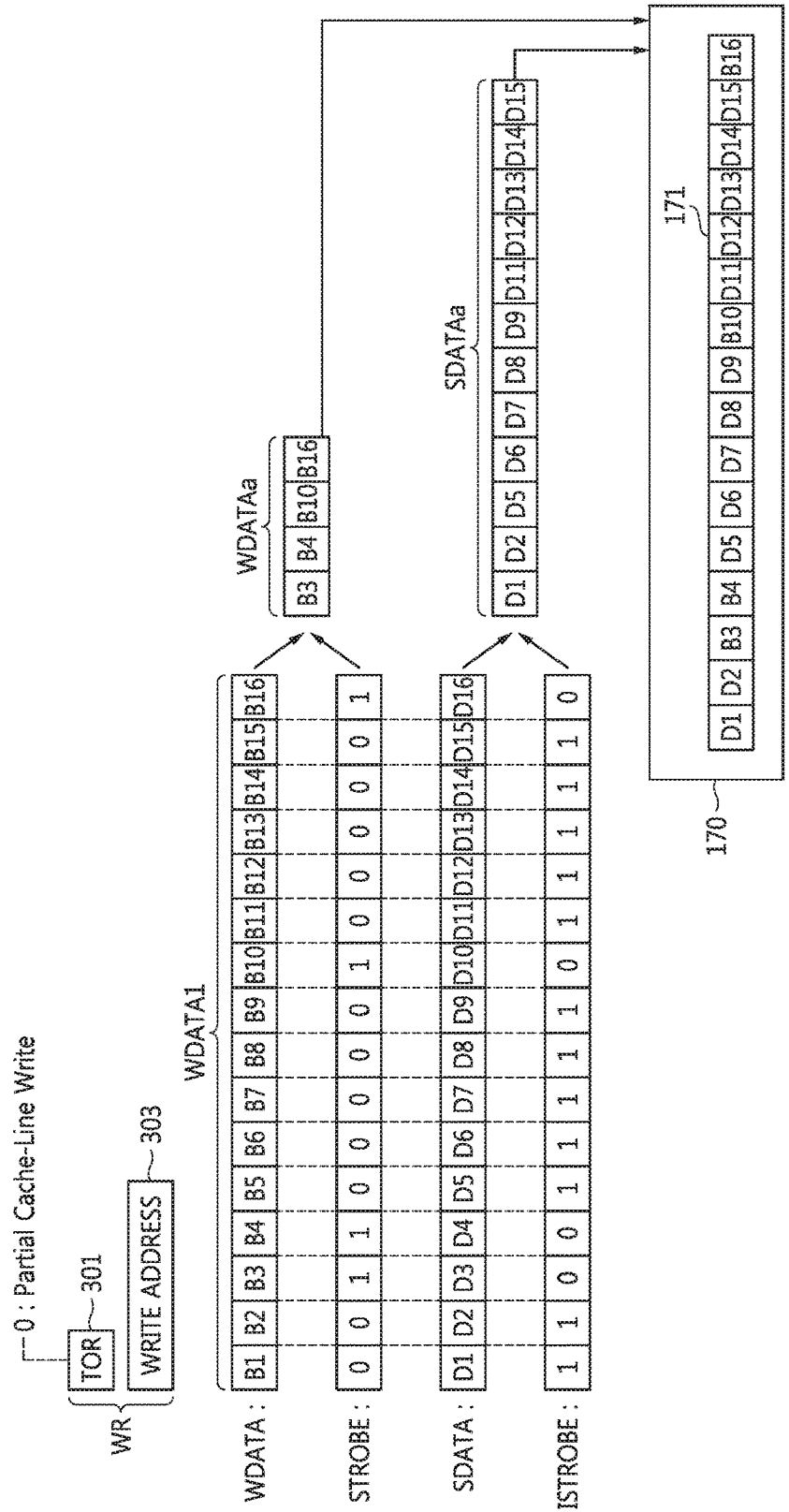
FIG. 7 is a diagram of a write request, strobe bits, and write data used in a data processing system performing the partial cache-line write illustrated in FIG. 6.

FIG. 6 is a diagram of a data flow for explaining a partial cache-line write of the data processing system 100 illustrated in FIG. 1. FIG. 7 is a diagram of a write request, strobe bits, and write data used in the data processing system 100 performing the partial cache-line write illustrated in FIG. 6.

Referring to FIGS. 1, 5, 6, and 7, the coherence manager 150 may also include the strobe buffer 159. The request tracker 151 of the coherence manager 150 receives the write request WR, the strobe bits STROBE, and the write data WDATA output from the first CPU 110 in operation S210. As shown in FIG. 7, the write request WR may include an indicator bit 301 and a write address 303. The request tracker 151 of the coherence manager 150 may allocate an entry 1 Entry 1 for the write request WR in operation S211 as shown in FIG. 3.

The request tracker 151 generates the snoop filter request SFR based on the write request WR and transmits, at substantially the same time or simultaneously, the snoop filter request SFR including the write address 303 to the snoop filter 153 and the write request WR, the strobe bits STROBE, and the write data WDATA (=WDATA1) to the memory controller 160 in operations S212-1 and S212-2. The request tracker 151 stores the strobe bits STROBE in the strobe buffer 159 in operation S212-3. Operations S212-1, S212-2, and S212-3 may be performed simultaneously, at substantially the same time, or in parallel (or overlapping one another in time).

The request tracker 151 need not wait for the snoop filter response HIT/MISS to be issued from the snoop filter 153 based on the snoop filter request SFR and instead may immediately transmit the write request WR, the strobe bits STROBE, and the write data WDATA to the memory controller 160 in operation S212-2.

The memory controller 160 receives at least one among the write request WR, the strobe bits STROBE, and the write data WDATA and sends a write completion response WCR1 to the request tracker 151 in operation S213. In other words, the memory controller 160 may immediately send the write completion response WCR1 to the request tracker 151 regardless of whether the write data WDATA has been written to the memory 170 in operation S213.

The memory controller 160 may select data WDATAa to be written to the memory 170 from the write data WDATA (=WDATA1) based on the strobe bits STROBE. For example, the memory controller 160 selects data units (e.g., bytes B3, B4, B10, and B16) corresponding to bit values having logic 1 in the strobe bits STROBE and sends the data WDATAa including the selected bytes B3, B4, B10, and B16 and the write command WC to the memory 170 in operation S214. The write command WC may be a command related to the write request WR. The memory 170 writes the data WDATAa including the bytes B3, B4, B10, and B16 to a memory area 171 in response to the write command WC in operation S216.

The snoop filter 153 searches the tag memory 155 for tag information corresponding to a write address included in the snoop filter request SFR and outputs the snoop filter response HIT/MISS to the request tracker 151 according to the search result in operation S218.

The request tracker 151 sends a snoop request SR to the second CPU 120 based on the snoop filter response HIT indicating a hit in operation S220. The snoop filter response HIT and/or the snoop request SR may include a write address or tag information corresponding to the write address.

The second CPU 120 performs a search operation SO on the second cache CACHE2 in response to the snoop request SR in operation S222 and may send a snoop response including dirty data SDATA to the request tracker 151 according to the result of the search operation SO in operation S224. Here, the dirty data SDATA is data that has been modified by the second CPU 120. When the snoop response includes the dirty data SDATA, operation S227 is performed. However, when the snoop response does not include the dirty data SDATA, operation S227 is not performed. For example, if a variable of a first size less than the second size of an entire cache line is present in memory 170, a copy of the variable is present in part of a cache line of the cache of the second CPU 120, other parts of the cache line have been recently updated (i.e., the dirty data), and the variable in memory 170 is to be updated with write data, then an area of the memory 170 of the second size having a first part storing the variable is updated such that the first part is updated with the write data and a remainder of the area is updated with the dirty data.

When the snoop response includes the dirty data SDATA, the request tracker 151 receives the dirty data SDATA from the second CPU 120 and inverts the bit value of each of the strobe bits STROBE stored in the strobe buffer 159 to generate inverted strobe bits ISTROBE in operation S228. When the inverted bit value is logic 0, a data unit, e.g., a byte corresponding to the inverted bit value is not stored in the memory 170. The request tracker 151 transmits the inverted strobe bits ISTROBE and the dirty data SDATA to the memory controller 160 in operation S230.

The memory controller 160 may select dirty data SDATAa to be written to the memory 170 from the dirty data SDATA based on the inverted strobe bits ISTROBE. For example, the memory controller 160 selects data units (e.g., bytes D1, D2, D5, D6, D7, D8, D9, D11, D12, D13, D14, and D15) corresponding to bit values having logic 1 in the inverted strobe bits ISTROBE and sends the dirty data SDATAa including the selected bytes D1, D2, D5, D6, D7, D8, D9, D11, D12, D13, D14, and D15 and a write command WC2 to the memory 170 in operation S232. The write command WC2 may be a command related to the write request WR.

The memory 170 writes the dirty data SDATAa including the selected bytes D1, D2, D5, D6, D7, D8, D9, D11, D12, D13, D14, and D15 to the memory area 171 in response to the write command WC2 in operation S234. The bytes D1, D2, B3, B4, D5, D6, D7, D8, D9, B10, D11, D12, D13, D14, D15, and B16 are stored in the memory area 171 through the write operations S216 and S234.

When a write operation of the dirty data SDATAa is completed, the memory 170 may generate a write completion response WCR2. The write completion response WCR2 may be transmitted to the request tracker 151 through the memory controller 160 in operation S236. Although the write completion response WCR2 is generated after operation S234 in the embodiments illustrated in FIG. 6, the memory controller 160 may receive the inverted strobe bits ISTROBE and the dirty data SDATA and send the write completion response WCR2 to the request tracker 151 in other embodiments.

The request tracker 151 performs de-allocation of an entry related with the write request WR based on the snoop response and the write completion responses WCR1 and WCR2 in operation S238. For example, as described above with reference to FIG. 3, when the snoop response can be used and the write operations of the data WDATAa and SDATAa are completed, the request tracker 151 performs de-allocation on entry 1 Entry 1 related with the write request WR in operation S238. Accordingly, the bit value of entry 1 may be changed from logic 1 to logic 0.

When the de-allocation is completed, the request tracker 151 sends the write request completion response CPR to the first CPU 110 through the wire set 141 and the first interface 143 in operation S240.

The coherence manager 150 performs operations S212-1 and S212-2, thereby reducing lifetime or latency of the write request WR or a write transaction.

Figure 8:
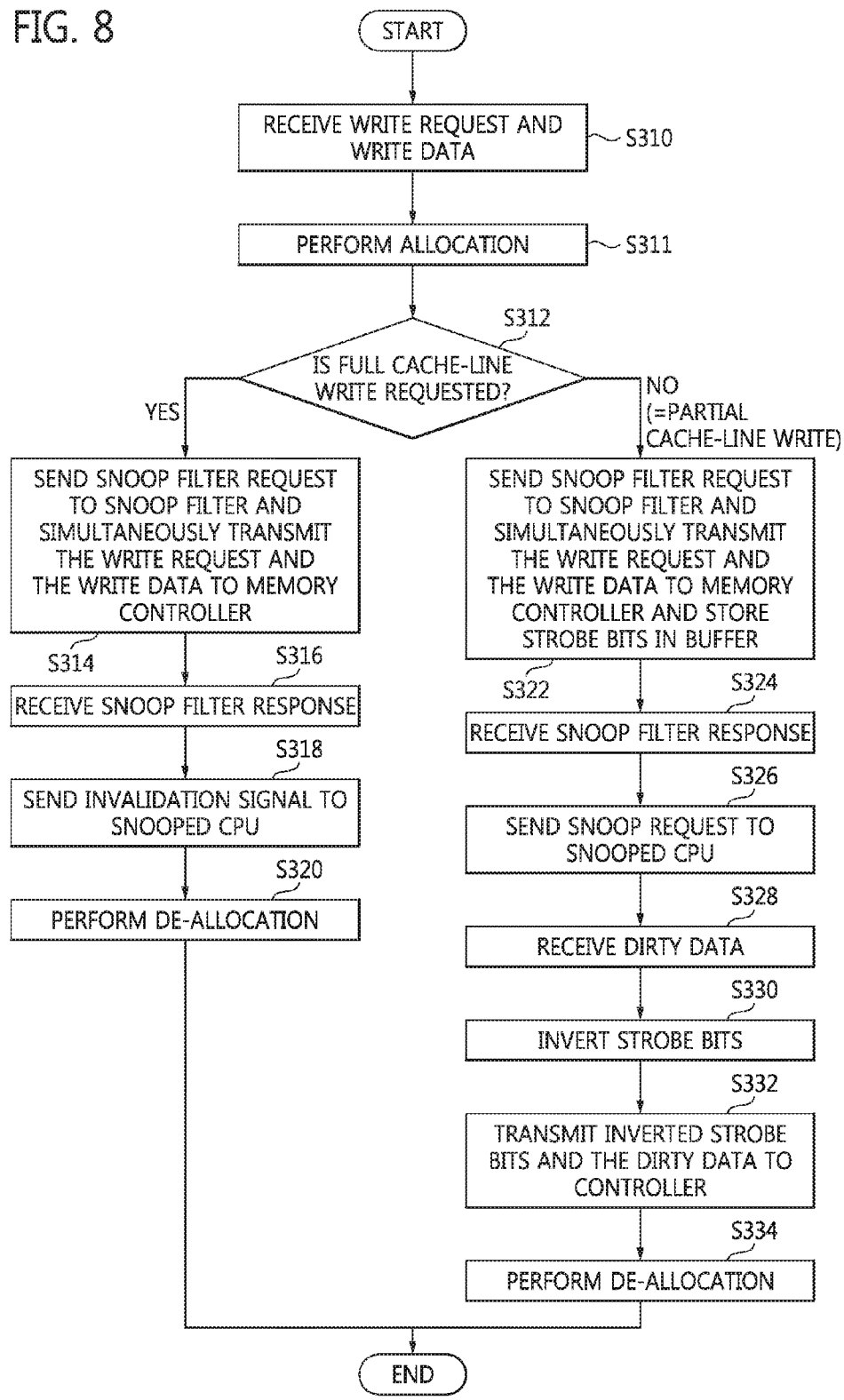
FIG. 8 is a flowchart of the operation of the data processing system illustrated in FIG. 1 according to an exemplary embodiment of the inventive concept.

FIG. 8 is a flowchart of the operation of the data processing system 100 illustrated in FIG. 1 according to an exemplary embodiment of the inventive concept. Referring to FIGS. 1 through 8, the coherence manager 150 receives the write request WR, the strobe bits STROBE, and the write data WDATA output from the first CPU 110 in operation S310. In some embodiments, the strobe bits STROBE may or may not be included in the write request WR.

The coherence manager 150 allocates the write request WR to an entry in operation S311 (e.g., performs an allocation). The coherence manager 150 determines whether the write request WR is for a full cache-line write or a partial cache-line write based on the indicator bit 201 or 301 included in the write request WR in operation S312. Operation S312 may be performed before operation S311 in other embodiments.

For example, when the bit value of the indicator bit 201 or 301 is logic 1 (e.g., full cache-line write), the coherence manager 150 performs operations S112-1 through S130 described with reference to FIG. 2 above. In other words, the coherence manager 150 transmits, simultaneously or at substantially the same time, the snoop filter request SFR to the snoop filter 153 and the write request WR, the strobe bits STROBE, and the write data WDATA to the memory controller 160 in operation S314. The memory controller 160 may send the write completion response WCR to the coherence manager 150 regardless of whether the write data WDATA has been written to the memory 170.

If the coherence manager 150 receives the snoop filter response HIT indicating a hit in operation S316, the coherence manager 150 sends the invalidation signal INS to the second CPU 120 in operation S318. The coherence manager 150 performs de-allocation on the entry (e.g., entry 1 Entry 1 in FIG. 3) related to the write request WR based on the invalidation completion response INCR and the write completion response WCR in operation S320. Since the coherence manager 150 performs operation S112-2 in the full cache-line write, it does not include any buffer for storing the write request WR, the strobe bits STROBE, and the write data WDATA.

For example, when the bit value of the indicator bit 201 or 301 is logic 0 (e.g., partial cache-line write), the coherence manager 150 performs operations S212-1 through S240 described with reference to FIG. 6 above. In other words, the coherence manager 150 transmits, simultaneously or at substantially the same time, the snoop filter request SFR to the snoop filter 153 and the write request WR, the strobe bits STROBE, and the write data WDATA to the memory controller 160 in operation S322. In addition, the coherence manager 150 may store the strobe bits STROBE in the strobe buffer 159 in operation S322 in parallel or simultaneously with operations S212-1 and S212-2. The memory controller 160 may write the partial data WDATAa of the write data WDATA to the memory 170 using the strobe bits STROBE.

If the coherence manager 150 receives the snoop filter response HIT indicating a hit in operation S324, the coherence manager 150 transmits the snoop request SR to the second CPU 120 in operation S326.

The second CPU 120 may send a snoop response including the dirty data SDATA to the coherence manager 150 in response to the snoop request SR. The coherence manager 150 receives the snoop response including the dirty data SDATA in operation S328 and reads the strobe bits STROBE from the strobe buffer 159 and inverts the strobe bits STROBE to generate the inverted strobe bits ISTROBE in operation S330.

The coherence manager 150 transmits the inverted strobe bits ISTROBE and the dirty data SDATA to the memory controller 160 in operation S332. The memory controller 160 may write the partial dirty data SDATAa of the dirty data SDATA to the memory 170 using the inverted strobe bits ISTROBE.

The coherence manager 150 performs de-allocation on the entry (e.g., entry 1 Entry 1 in FIG. 3) related with the write request WR based on the snoop response and the write completion responses WCR1 and WCR2 in operation S334.

In an exemplary embodiment, the steps of FIG. 2, FIG. 6, or FIG. 8 are embodied as computer-readable codes on a computer-readable medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. Also, functional programs, codes, and code segments may be developed to accomplish the steps.

Figure 9:
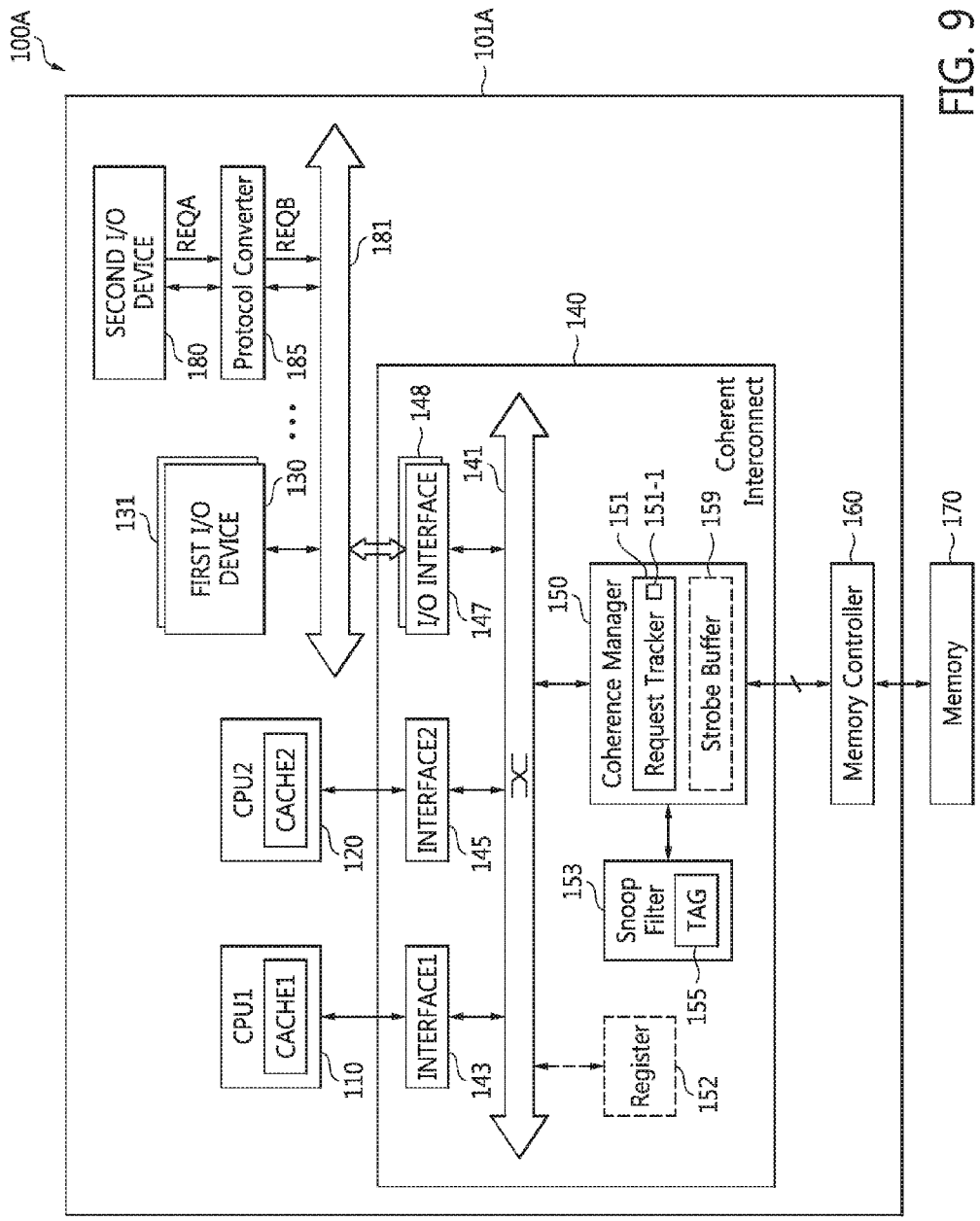
FIG. 9 is a block diagram of a data processing system according to an exemplary embodiment of the inventive concept.
Figure 10:
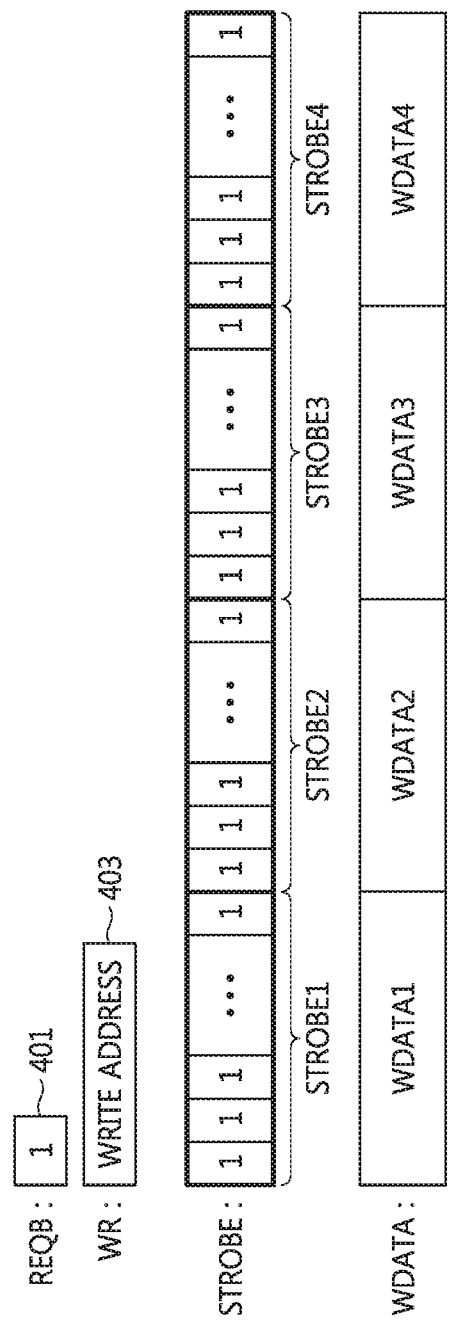
FIG. 10 is a diagram of output signals of a protocol converter illustrated in FIG. 9.

FIG. 9 is a block diagram of a data processing system 100A according to an exemplary embodiment of the inventive concept. FIG. 10 is a diagram of output signals of a protocol converter 185 illustrated in FIG. 9. Referring to FIGS. 1 through 10, the data processing system 100A includes a data processing apparatus 101A and the memory 170.

The data processing apparatus 101A may control a write operation and a read operation of the memory 170. The data processing apparatus 101A may be an IC, a SoC, a processor, an AP, a mobile AP, a chipset, or a group of chips. The data processing apparatus 101A may include a plurality of the CPUs 110, and 120, the coherent interconnect 140, the memory controller 160, a bus 181, the first I/O devices 130 and 131 connected to the bus 181, and the protocol converter 185 connected between the bus 181 and a second I/O device 180.

The first I/O devices 130 and 131 may share data with the CPUs 110 or 120 and may generate (or trigger) a coherent transaction (or snooping). The second I/O device 180 may share data with the CPUs 110 or 120 but is not able to generate (or trigger) a coherent transaction (or snooping).

The protocol converter 185 may convert a first indicator signal REQA which cannot trigger a coherent transaction (or snooping) into a second indicator signal REQB which can trigger a coherent transaction (or snooping). For example, the first indicator signal REQA may be compatible with an Advanced eXtensible Interface 3 (AXI3) or an Advanced eXtensible Interface 4 (AXI4) and the second indicator signal REQB may be compatible with AXI Coherency Extensions (ACE) or ACE-Lite. The first indicator signal REQA and/or the second indicator signal REQB may be a dedicated signal for indicating that a current write operation is a full cache-line write. The first indicator signal REQA may be transmitted to the protocol converter 185 through a first dedicated line and the second indicator signal REQB may be transmitted to the bus 181 through a second dedicated line.

When the first indicator signal REQA is not used, the coherent interconnect 140 needs to receive the last one among a plurality of data or all of the plurality of data output from the second I/O device 180 to determine whether a write operation of the plurality of data is a full cache-line write or a partial cache-line write. In other words, the second I/O device 180 does not output a signal corresponding to the first indicator signal REQA.

However, when the first indicator signal REQA is used, the protocol converter 185 converts the first indicator signal REQA into the second indicator signal REQB, and therefore, the coherent interconnect 140 is able to determine whether the current write operation is the full cache-line write or a partial cache-line write based on the second indicator signal REQB without receiving the last data WDATA4, as shown in FIG. 10. For example, the second indicator signal REQB may be set to logic 1. Accordingly, the data processing apparatus 101A may perform the operation shown in FIG. 2.

Figure 11:
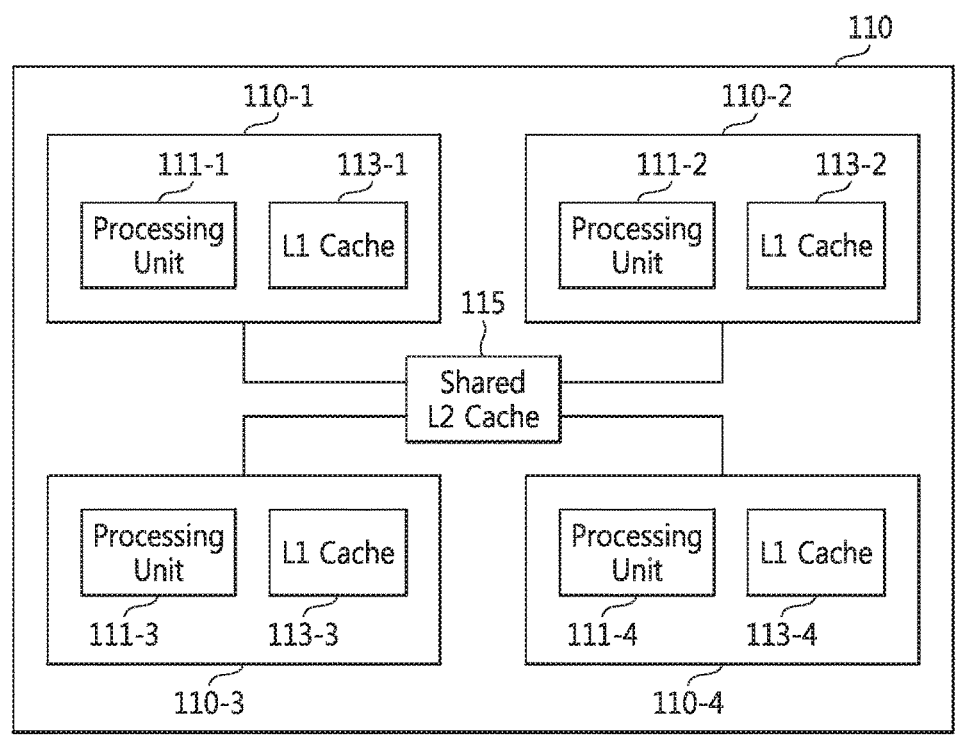
FIG. 11 is a detailed block diagram of a first central processing unit (CPU) illustrated in FIG. 1 according to an exemplary embodiment of the inventive concept.

FIG. 11 is a detailed block diagram of the first CPU 110 illustrated in FIG. 1 according to an exemplary embodiment of the inventive concept. Referring to FIG. 11, the first CPU 110 include a plurality of cores 110-1, 110-2, 110-3, and 110-4 and a level-2 (L2) cache 115 shared by the cores 110-1 through 110-4. The structure of the second CPU 120 is the same as or similar to that of the first CPU 110. The cores 110-1 through 110-4 may include processing units 111-1, 111-2, 111-3, and 111-4, respectively, and level-1 (L1) caches 113-1, 113-2, 113-3, and 113-4, respectively. Each of the processing units 111-1 through 111-4 may be a central processing circuit.

As described above, according to at least one embodiment of the inventive concept, a coherent interconnect including a snoop filter and a coherence manager receives a write request, strobe bits, and write data output from a CPU and immediately transmits the write request, the strobe bits, and the write data to a memory controller without waiting for the operation of the snoop filter. Thus, as soon the memory controller receives at least one among the write request, the strobe bits, and the write data, the memory controller sends a write completion response to the coherence manager. Since the coherent interconnect immediately transmits the write request, the strobe bits, and the write data to the memory controller without waiting for a snoop response of the snoop filter, latency involved in the snoop filter may be reduced.

While the inventive concept has been particularly shown and described with reference to exemplary embodiments thereof, it will be understood by those of ordinary skill in the art that various changes in forms and details may be made therein without departing from the spirit and scope of the inventive concept.

What is claimed is:

1. A coherent interconnect comprising:
a snoop filter; and
a circuit configured to receive a write request, strobe bits, and write data output from a first central processing unit (CPU), to generate a snoop filter request based on the write request, and at substantially the same time, to transmit the snoop filter request to the snoop filter and transmit the write request, the strobe bits, and the write data to a memory controller,
wherein each of the strobe bits indicates whether a unit of data included in the write data is to overwrite a corresponding part in a memory connected to the memory controller,
wherein the circuit determines whether to store the strobe bits in a strobe buffer included in the circuit based on an indicator bit included within the write request,
wherein the unit of data is a byte, and
wherein the circuit stores the strobe bits in the strobe buffer only when the indicator bit has a bit value indicating a partial cache-line write.

2. The coherent interconnect of claim 1, wherein the circuit transmits the write request, the strobe bits, and the write data to the memory controller without waiting for a snoop filter response generated from the snoop filter based on the snoop filter request.

3. The coherent interconnect of claim 1, wherein the circuit sends a second CPU an invalidation signal for invalidating data stored in a cache of the second CPU related to the write request based on a snoop filter response output from the snoop filter that indicates a hit.

4. The coherent interconnect of claim 3, wherein the circuit performs de-allocation on an entry related to the write request in response to an invalidation completion response output from the second CPU and a write completion response output from the memory controller with respect to the write data.

5. The coherent interconnect of claim 1,
wherein the circuit generates a snoop request to be transmitted to a second CPU based on a snoop filter response output from the snoop filter that indicates a hit;
wherein the circuit inverts a bit value of each of the strobe bits stored in the strobe buffer to generate inverted strobe bits based on a snoop response output from the second CPU that includes dirty data; and
wherein the circuit transmits the inverted strobe bits and the dirty data to the memory controller.

6. The coherent interconnect of claim 5, wherein the circuit performs de-allocation of an entry related to the write request in response to the snoop response output from the second CPU, a first write completion response output from the memory controller with respect to the write data, and a second write completion response output from the memory controller with respect to the dirty data.

7. A data processing apparatus comprising:
a first central processing unit (CPU);
a second CPU including a cache;
a memory controller; and
a coherent interconnect connected with the first CPU, the second CPU, and the memory controller,
wherein the coherent interconnect comprises:
a snoop filter; and
a circuit configured to receive a write request, strobe bits, and write data from the first CPU, to generate a snoop filter request based on the write request, and at substantially the same time, to transmit the snoop filter request to the snoop filter and transmit the write request, the strobe bits, and the write data to the memory controller,
wherein the circuit determines whether the write request is one of a full cache-line write or a partial cache line write based on an indicator bit included in the write request,
wherein the circuit determines whether to store the strobe bits in a strobe buffer included in the circuit based on the indicator bit included in the write request,
wherein each of the strobe bits indicates whether a corresponding byte included in the write data is to be updated, and
wherein the circuit stores the strobe bits in the strobe buffer only when the indicator bit has a bit value indicating a partial cache-line write.

8. The data processing apparatus of claim 7, wherein the circuit sends the second CPU an invalidation signal for invalidating data stored in the cache related to the write request based on a snoop filter response output from the snoop filter that indicates a hit.

9. The data processing apparatus of claim 8, wherein the circuit performs de-allocation on an entry related to the write request in response to an invalidation completion response output from the second CPU and a write completion response output from the memory controller with respect to the write data.

10. The data processing apparatus of claim 7,
wherein the circuit generates a snoop request to be transmitted to the second CPU based on a snoop filter response output from the snoop filter that indicates a hit;
wherein the circuit inverts a hit value of each of the strobe bits stored in the strobe buffer to generated inverted strobe bits based on a snoop response output from the second CPU that includes dirty data; and
wherein the circuit transmits the inverted strobe bits and the dirty data to the memory controller.

11. The data processing apparatus of claim 10, wherein the circuit performs de-allocation of an entry related to the write request in response to the snoop response output from the second CPU, a first write completion response output from the memory controller with respect to the write data, and a second write completion response output from the memory controller with respect to the dirty data.

12. A data processing system comprising:
a memory; and
a data processing apparatus connected with the memory,
wherein the data processing apparatus comprises:
a first central processing unit (CPU);
a second CPU comprising a cache; a memory controller connected with the memory; and
a coherent interconnect connected with the first CPU, the second CPU, and the memory controller, wherein the coherent interconnect comprises:
a snoop filter; and
a circuit configured to receive a write request, strobe bits, and write data from the first CPU, to generate a snoop filter request based on the write request, and at substantially the same time, transmit the snoop filter request to the snoop filter and transmit the write request, the strobe bits, and the write data to the memory controller,
wherein each of the strobe bits indicates whether a corresponding unit of data included in the write data is to overwrite a corresponding part in a memory connected to the memory controller, wherein the write request includes an indicator bit, the circuit stores the strobe bits in the strobe buffer only when the indicator bit has a bit value indicating a partial cache-line write, the memory controller writes part of the write data to the memory based on the strobe bits, and the unit of data is a byte.

13. The data processing system of claim 12, wherein the memory controller outputs a write completion response to the circuit as soon as the memory controller receives at least one among the write request, the strobe bits, and the write data.

14. The data processing system of claim 13, wherein the circuit sends the second CPU an invalidation signal for invalidating data stored in the cache related to the write request based on a snoop filter response output from the snoop filter that indicates a hit; and wherein the circuit performs de-allocation on an entry related to the write request in response to an invalidation completion response output from the second CPU and the write completion response.

15. The data processing system of claim 12, wherein the circuit generates a snoop request based on a snoop filter response output from the snoop filter that indicates a hit, transmits the snoop request to the second CPU, inverts a bit value of each of the strobe bits stored in the strobe buffer to generate inverted strobe bits based on a snoop response output from the second CPU that includes dirty data, and transmits the inverted strobe bits and the dirty data to the memory controller; and wherein the memory controller writes part of the dirty data to the memory based on the inverted strobe bits.

* * * * *